(12) United States Patent
Jiang et al.

(10) Patent No.: US 12,210,982 B2
(45) Date of Patent: Jan. 28, 2025

(54) INTELLIGENT QUESTION-ANSWERING PROCESSING METHOD AND SYSTEM, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Wenbin Jiang, Beijing (CN); Yajuan Lyu, Beijing (CN); Yong Zhu, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 310 days.

(21) Appl. No.: 17/872,318

(22) Filed: Jul. 25, 2022

(65) Prior Publication Data
US 2023/0092736 A1 Mar. 23, 2023

(30) Foreign Application Priority Data
Sep. 18, 2021 (CN) .......................... 202111098225.1

(51) Int. Cl.
G06F 40/30 (2020.01)
G06F 40/20 (2020.01)
G06N 5/04 (2023.01)
(52) U.S. Cl.
CPC .............. *G06N 5/04* (2013.01); *G06F 40/20* (2020.01); *G06F 40/30* (2020.01)

(58) Field of Classification Search
None
See application file for complete search history.

(56) References Cited

U.S. PATENT DOCUMENTS

2015/0356142 A1 12/2015 Proux
2021/0326751 A1* 10/2021 Liu .......................... G06N 3/084

FOREIGN PATENT DOCUMENTS

| CN | 109582798 A | 4/2019 |
| CN | 111078836 A | 4/2020 |
| CN | 111382255 A | 7/2020 |
| CN | 111797870 A | 10/2020 |

(Continued)

OTHER PUBLICATIONS

Chen et al., Basic Theories and Methods of Natural Language Processing, Harbin Institute of Technology Press, ISBN 978-7-5603-4126-2, Aug. 2013, 11 pages.

(Continued)

Primary Examiner — Quynh H Nguyen
(74) Attorney, Agent, or Firm — Brooks Kushman P.C.

(57) ABSTRACT

The present disclosure provides a method for processing intelligent question-answering, an intelligent question-answering system, an electronic device and a storage medium, and relates to the field of artificial intelligence technologies, such as machine learning technologies, natural language processing technologies, or the like. An implementation includes: acquiring an input question and input data information; and based on the question, the data information and a plurality of knowledge bases, deciding an answer to the question by multilayer appreciation using a plurality of understanding module layers.

16 Claims, 6 Drawing Sheets

(56) References Cited

FOREIGN PATENT DOCUMENTS

| CN | 112559727 A | 3/2021 |
| CN | 112749262 A | 5/2021 |
| CN | 112949286 A | 6/2021 |
| WO | 2021120543 A1 | 6/2021 |

OTHER PUBLICATIONS

Gan et al, Artificial Intelligence, Harbin Engineering University Press, ISBN 978-7-5661-2957-4, Apr. 2021, 8 pages.
Extended European Search Report of European patent application No. 22186185.9 issued Dec. 21, 2022, 10 pages.
Ardhian et al., Learning Explicit and Implicit Knowledge with Differentiable Neural Computer, ICACSIS, 2017, 297-302.
Li et al. Research on Open Domain Question Answering Based on Kowledge Base, China University of Mining and Technology, vol. 15, No. 36, Dec. 2020, 3 pages.

* cited by examiner

INTELLIGENT QUESTION-ANSWERING PROCESSING METHOD AND SYSTEM, ELECTRONIC DEVICE AND STORAGE MEDIUM

CROSS-REFERENCE TO RELATED APPLICATIONS

The present application claims the priority of Chinese Patent Application No. 202111098225.1, filed on Sep. 18, 2021, with the title of "INTELLIGENT QUESTION-ANSWERING PROCESSING METHOD AND SYSTEM, ELECTRONIC DEVICE AND STORAGE MEDIUM." The disclosure of the above application is incorporated herein by reference in its entirety.

FIELD OF THE DISCLOSURE

The present disclosure relates to the field of computer technologies, and particularly relates to the field of artificial intelligence technologies, such as machine learning technologies, natural language processing technologies, or the like, and particularly to a method for processing intelligent question-answering, an intelligent question-answering system, an electronic device and a storage medium.

BACKGROUND OF THE DISCLOSURE

An intelligent question-answering task is a representative complex cognitive task, which aims to acquire and calculate answers to user questions from data information according to the questions.

In a prior art, an intelligent question-answering system based on artificial intelligence (AI) may be used to realize an intelligent question-answering operation. In practical applications, the intelligent question-answering system may be distributed in various application scenarios in various fields. For example, the intelligent question-answering system may be introduced in scenarios, such as an intelligent sound box in a home, intelligent guidance robots in various meeting places, various professional learning systems, or the like, so as to intelligently answer the user questions.

SUMMARY OF THE DISCLOSURE

The present disclosure provides a method for processing intelligent question-answering, an intelligent question-answering system, an electronic device and a storage medium According to one aspect of the present disclosure, there is provided a method for processing intelligent question-answering, including acquiring an input question and input data information; and based on the question, the data information and a plurality of knowledge bases, deciding an answer to the question by multilayer appreciation using a pre-trained multilayer understanding model.

According to another aspect of the present disclosure, there is provided an electronic device, including at least one processor; and a memory communicatively connected with the at least one processor; wherein the memory stores instructions executable by the at least one processor, and the instructions are executed by the at least one processor to enable the at least one processor to perform a method for processing intelligent question-answering, wherein the method includes acquiring an input question and input data information; and based on the question, the data information and a plurality of knowledge bases, deciding an answer to the question by multilayer appreciation using plural understanding module layers.

According to still another aspect of the present disclosure, there is provided a non-transitory computer readable storage medium with computer instructions stored thereon, wherein the computer instructions are used for causing a method for processing intelligent question-answering, wherein the method includes acquiring an input question and input data information; and based on the question, the data information and a plurality of knowledge bases, deciding an answer to the question by multilayer appreciation using a pre-trained multilayer understanding model.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Apparently, the embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that a terminal device in the embodiments of the present disclosure may include, but is not limited to, a mobile phone, a personal digital assistant (PDA), a wireless handheld device, a tablet computer, and other smart devices; a display device may include, but not limited to, a personal computer, a television, and other devices with a display function.

In addition, the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Existing intelligent question-answering systems may firstly receive a user question and data information input by a user. Then, the user question and the data information are understood; and an answer corresponding to the user question is acquired according to an understanding result. In the process of understanding the user question and the data information, entities and relationships related to the user question and the data information may be retrieved from an external database in conjunction with knowledge of the external database, and the knowledge corresponding to the entities or relationships is introduced at one time to assist the intelligent question-answering system in understanding the user question and the data information.

Figure 1:
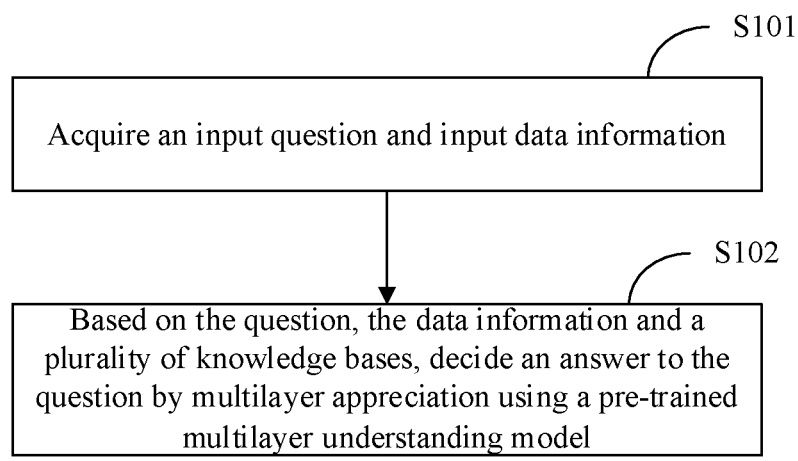
FIG. 1 is a schematic diagram according to a first embodiment of the present disclosure.

FIG. 1 is a schematic diagram according to a first embodiment of the present disclosure; as shown in FIG. 1, the present embodiment provides a method for processing intelligent question-answering, which may include the following steps:

S101: acquiring an input question and input data information; and

S102: based on the question, the data information and a plurality of knowledge bases, deciding an answer to the question by multilayer appreciation using a pre-trained multilayer understanding model.

An intelligent question-answering system may serve as an execution subject of the method for processing intelligent question-answering according to the present embodiment, and may be an electronic entity or an application integrated using software; in use, a user inputs the question and the data information into the intelligent question-answering system, and the intelligent question-answering system, based on the question, the data information and the plural knowledge bases, may decide the answer to the question by multilayer appreciation using the multilayer understanding model and output the answer.

The question input by the user in the present embodiment may be a sentence in a natural language form, the data information may be in a form of a graph, a table, a document, a video, or the like, and according to the form of the data information, intelligent question-answering types in the present embodiment may correspondingly include specific types, such as a graph question-answering type, a table question-answering type, a text question-answering type, a video question-answering type, or the like. Since the question of the user is described in a natural language, understanding difficulty is determined by flexible expression and ambiguous characteristics of the question. The data information (whether structured graphs and tables or unstructured documents and videos) is a complex data object difficult to understand. Intelligent question-answering difficulty depends not only on respective appreciation of the question and the data information, but also on interactive inference of an understanding process of the question and the data information. The question of the user and the data information are required to be comprehensively understood and inferred to formulate a solution path for acquiring the answer to the question from the data information. Therefore, deep appreciation and inference about the question of the user and the data information is a core difficulty of an intelligent question-answering operation.

In addition, it is considered that human understanding and inference processes of the question of the user and the data information show obvious levels, and different types of knowledge are called at different levels to assist appreciation. For example, given a table describing food functions and contraindications, a question "what is better to eat in summer"?" is answered. A human understands the question as "what is suitable for eating in summer" according to language knowledge, learns that a "high temperature" is generated in "summer" and causes "irritability" and human diet is required to follow a contraindication principle according to common knowledge, and finally gives a reasonable answer "bitter gourd clears summer heat, cucumber quenches thirst and relieves irritability, and bitter gourd and raw cucumber should not be eaten together . . . " by appreciation and inference of plural levels of morphology, syntax, semantics, pragmatics, or the like, in conjunction with effects and the contraindications of food in the table. The question of the user and the data information are natural expression of human needs and information content, and much of common knowledge associated with the question of the user and the data information is not explicitly given. If the intelligent question-answering system is used to simulate the human understanding and inference process, different types of knowledge are required to be explicitly given in the understanding and inference process of each layer.

Based on the above, in the method for processing intelligent question-answering according to the present embodiment, after the input question and the input data information are obtained, the answer to the question may be decided based on the question, the data information and the plural knowledge bases by multilayer appreciation using the multilayer understanding model, and compared with one-time introduction of knowledge in a prior art, the human understanding and inference process may be more truly simulated, and a more accurate answer may be obtained, thus further improving an efficiency of the intelligent question-answering system, and enhancing intelligence of the intelligent question-answering system.

For example, the plurality of knowledge bases in the present embodiment may take a form of a knowledge graph. The plural knowledge bases may be stored locally in the intelligent question-answering system, or may be external, and may be called by the intelligent question-answering system when in use.

Figure 2:
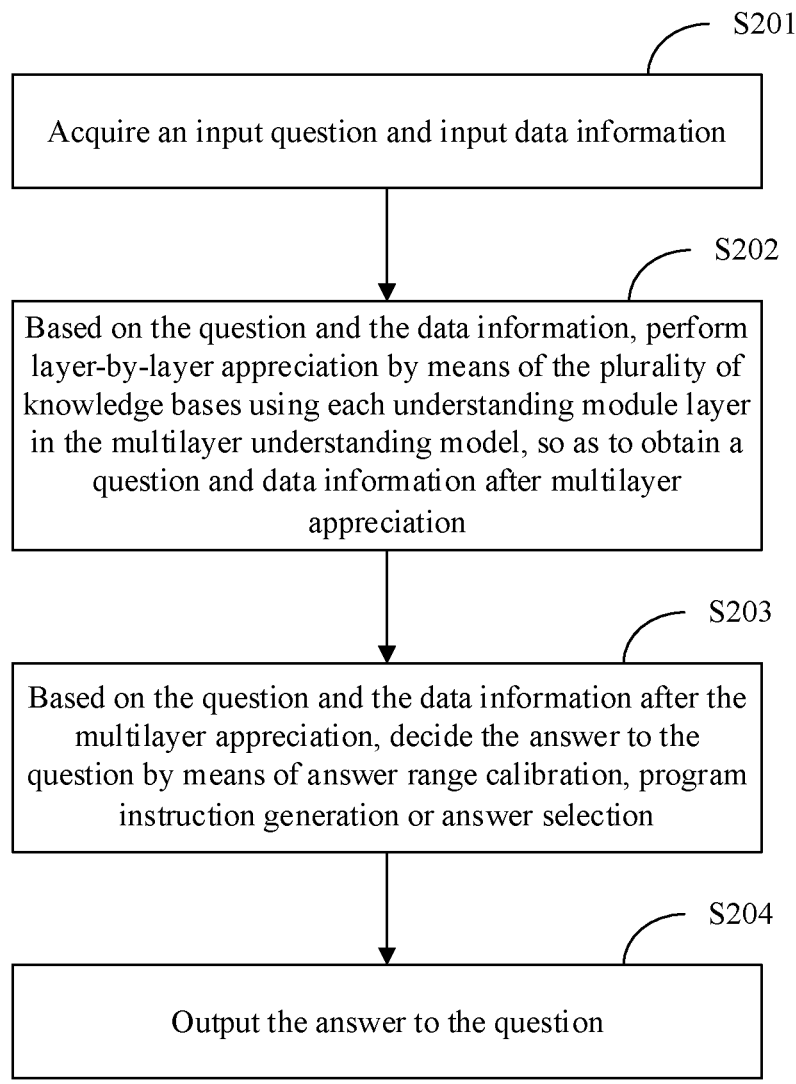
FIG. 2 is a schematic diagram according to a second embodiment of the present disclosure.

FIG. 2 is a schematic diagram according to a second embodiment of the present disclosure; the technical solution of a method for processing intelligent question-answering according to the present embodiment of the present disclosure is further described in more detail based on the technical solution of the above-mentioned embodiment shown in FIG. 1. As shown in FIG. 2, the method for processing intelligent question-answering according to the present embodiment may include the following steps:

S201: acquiring an input question and input data information.

For details of this step, reference may be made to the description of step S101 in the above-mentioned embodiment shown in FIG. 1, and details are not repeated herein.

S202: based on the question and the data information, performing layer-by-layer appreciation by means of a plurality of knowledge bases using each understanding module layer in a multilayer understanding model, so as to obtain the question and the data information after multilayer appreciation.

In the present embodiment, the method for processing intelligent question-answering according to the present embodiment may be applied to an intelligent question-answering system to describe the technical solution of the present disclosure in detail.

Figure 3:
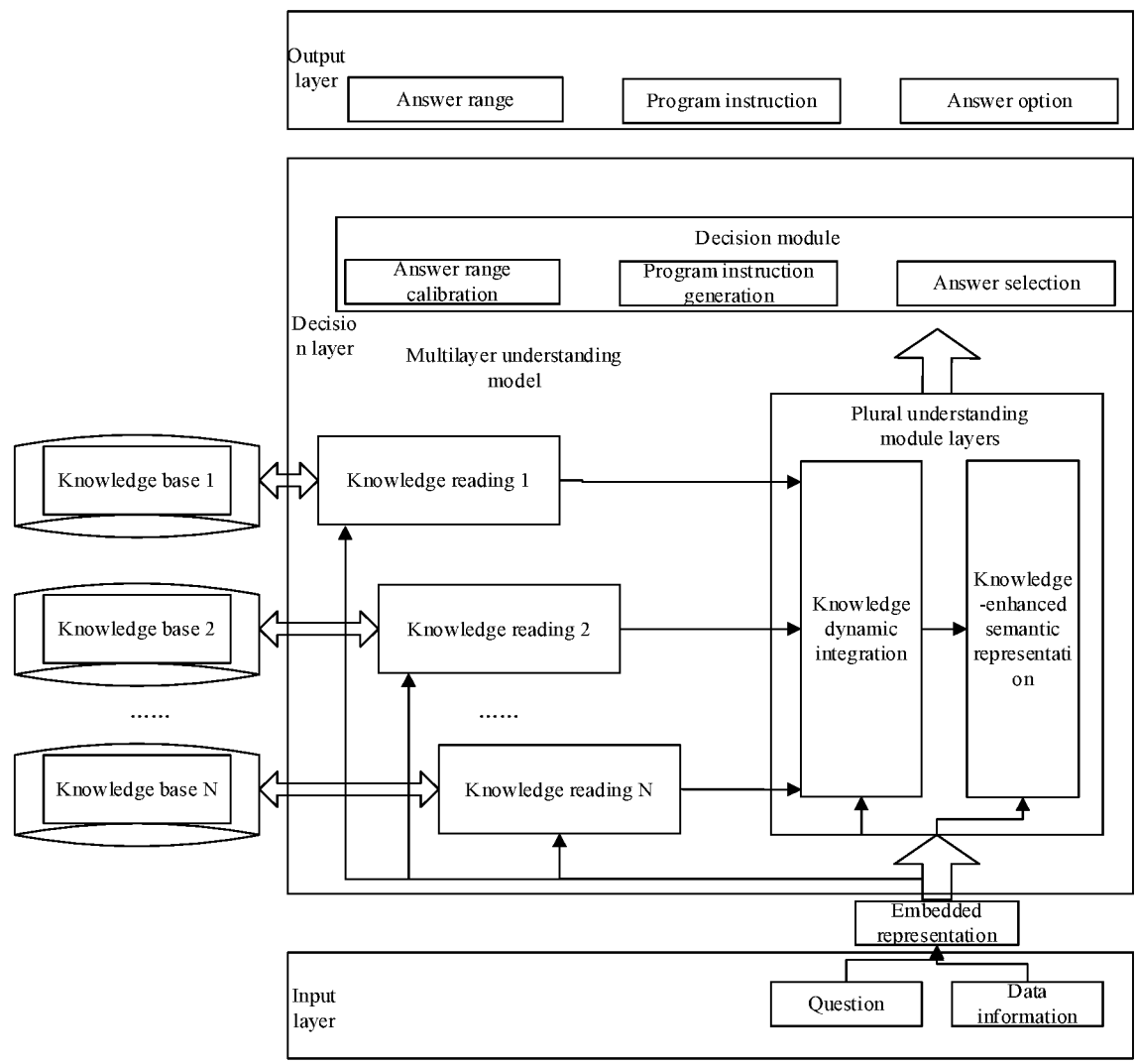
FIG. 3 is a principle diagram of an intelligent question-answering system according to the present embodiment.

For example, FIG. 3 is a principle diagram of the intelligent question-answering system according to the present embodiment. As shown in FIG. 3, the intelligent question-answering system is divided into an input layer, a decision layer and an output layer, and the multilayer understanding model is specifically adopted as the decision layer, and specifically may include plural understanding module layers and a decision module. As shown in FIG. 3, for example, N knowledge bases are included. Each of the N knowledge bases may correspond to one knowledge reading module to read knowledge from the corresponding knowledge base. However, the knowledge bases in the N knowledge bases from which each understanding module layer reads the knowledge, and weight of the read knowledge are determined in a training process of the intelligent question-answering system.

The above-mentioned step S201 of acquiring an input question and input data information may be performed in the input layer. Specifically, the question input by a user and acquired in the input layer is a natural sentence, and the data information may be in a form of a graph, a table, a document, a video, or the like, but is also represented based on characters. Therefore, in the input layer, the acquired question and data information may be subjected to embedded representation, so as to obtain the question and data information in a vector form. Certainly, optionally, the embedded representation may be implemented in the decision layer.

Further, step S202 may include the following steps during implementation.

Firstly, the question and the data information are understood with reference to the plural knowledge bases using a first understanding module layer in the multilayer understanding model, so as to obtain a first question and first data information after the appreciation.

Then, the question and the data information after appreciation by the previous layer are understood with reference to the plural knowledge bases sequentially using each of a second understanding module layer to a last understanding module layer of the multilayer understanding model, so as to obtain a question and data information after the appreciation.

Specifically, the first understanding module layer in the multilayer understanding model may be adopted to introduce first-layer knowledge information from the plural knowledge bases based on the question and the data information, and then understand the question and the data information based on the introduced first-layer knowledge information to obtain the first question and the first data information after the appreciation.

The second to Mth understanding module layers of the multilayer understanding model have same processing logic.

For example, the second understanding module layer may introduce second-layer knowledge information from the plural knowledge bases based on the first question and the first data information after the appreciation by the previous understanding module layer (i.e., the first understanding module layer), and then, based on the introduced second-layer knowledge information, understand the first question and the first data information after the appreciation by the previous layer, so as to obtain a second question and second data information after the appreciation.

The third understanding module layer may introduce third-layer knowledge information from the plural knowledge bases based on the second question and the second data information after the appreciation by the previous understanding module layer (i.e., the second understanding module layer), and then, based on the introduced third-layer knowledge information, understand the second question and the second data information after the appreciation by the previous layer, so as to obtain a third question and third data information after the appreciation.

By analogy, it may be known that the jth understanding module layer (j is greater than 2 and less than M) may introduce jth-layer knowledge information from the plural knowledge bases based on the (j−1)th question and the (j−1)th data information after the appreciation by the previous understanding module layer (i.e., the (j−1)th understanding module layer), and then, based on the introduced jth-layer knowledge information, understand the (j−1)th question and the (j−1)th data information after the appreciation by the previous layer, so as to obtain a jth question and jth data information after the appreciation.

The last understanding module layer (i.e., the Mth understanding module layer) may introduce Mth-layer knowledge information from the plural knowledge bases based on the (M−1)th question and the (M−1)th data information after the appreciation by the previous understanding module layer (i.e., the (M−1)th understanding module layer), and then, based on the introduced Mth-layer knowledge information, understand the (M−1)th question and the (M−1)th data information after the appreciation by the previous layer, so as to obtain an Mth question and Mth data information after the appreciation (i.e., the question and the data information after the appreciation by the M layers).

In general, each understanding module layer in the multilayer understanding model in the present embodiment performs deep appreciation by means of the knowledge of the plurality of knowledge bases based on the understanding result of the previous understanding module layer. For example, based on the input question and data information, the first understanding module layer performs the first layer appreciation, and the second understanding module layer performs the second layer appreciation based on the first question and the first data information after the first layer appreciation to obtain the second question and the second data information; by analogy, the j-th understanding module layer performs the jth layer appreciation based on the (j−1)th question and the (j−1)th data information after the (j−1)th layer appreciation to obtain the jth question and the jth data information, and so on, until the last understanding module layer performs the appreciation, and finally, the question and the data information after the multilayer appreciation are obtained. That is, each understanding module layer performs the deep appreciation based on the understanding result of the previous understanding module layer, instead of understanding the original question and data information.

In one embodiment of the present disclosure, for example, the multilayer understanding model includes M understanding module layers; based on the question and the data information, i understanding module layers from the first understanding module layer to the ith understanding module layer in the multilayer understanding model may be adopted to perform layer-wise deepening appreciation at the morphology and/or syntax level by means of the plural knowledge bases, so as to obtain an ith question and ith data information after the ith layer appreciation; i is a positive integer greater than 1 and less than M.

Further, based on the ith question and the ith data information after the appreciation by the ith understanding module layer, M-i understanding module layers from the (i+1)th understanding module layer to the Mth understanding module layer in the multilayer understanding model may be successively adopted to perform layer-wise deepening appreciation at the semantics and/or pragmatics level by means of the plural knowledge bases, so as to obtain the question and the data information after the multilayer appreciation.

Based on the above, it may be understood that, in the lower understanding module layer, an information processing operation similar to an information processing operation at the morphology and/or syntax level is performed, and at this point, relevant knowledge of the morphology and/or syntax level is required to be read from the plurality of knowledge bases. In the higher understanding module layer, an information processing operation similar to an information processing operation at the semantics and/or pragmatics level is performed, and at this point, relevant knowledge of the semantics and/or pragmatics level is required to be read from the plurality of knowledge bases. Thus, a thinking process of a human may be fully simulated by means of layer-wise deepening appreciation, such that the question and the data information may be more accurately and deeply understood, thus more accurately obtaining the answer to the question.

A specific number of the understanding module layers included in the multilayer understanding model in the present embodiment may be predetermined before a training operation, and may be, for example, 3, 5, or another positive integer greater than or equal to 2. A number of the knowledge bases may be greater than or equal to 2, and the knowledge bases may be divided according to fields, such as a basic language field, a communication field, a radio field, a finance field, a sports field, an entertainment field, or the like. Certainly, the knowledge bases may be divided according to other types, which are not repeated herein.

Based on the above, it may be known that, in the present embodiment, when the first understanding module layer introduces the knowledge information, the knowledge information is driven and acquired based on the question and the data information. The question and the data information may be used as context information of a current understanding module, and based on the context information, the relevant knowledge information in the plurality of external knowledge bases may be read dynamically. Then, the read relevant knowledge information is dynamically integrated according to the context information, and finally, knowledge-enhanced semantic representation is formed by the integrated knowledge information and the context information to serve as context information of the next layer. The formed knowledge-enhanced semantic representation is the question and the data information after the appreciation obtained based on the introduced knowledge information.

For the second understanding module layer to the last understanding module layer, the question and the data information after the appreciation by the previous layer are driven to serve as the context information, and the relevant knowledge information in the plurality of external knowledge bases is dynamically read under the drive of the context information. The context information for the next layer may be obtained by the same follow-up inference process. By means of the layer-wise deepening appreciation, each layer may dynamically acquire the related knowledge from the plurality of external knowledge bases based on the understanding result of the previous layer, and perform deeper appreciation, such that the question and the data information may be subjected to layer-wise deepening appreciation, thereby effectively assisting in acquiring the answer.

The multilayer understanding model in the present embodiment may be a multilayer transformer or a multilayer graph neural network (GNN), or another specially designed multilayer neural network. The plural knowledge bases in the present embodiment may be external professional knowledge bases, and when in use, vectorized knowledge representation of different knowledge graphs may be adopted for the plural external knowledge bases. For each knowledge base, a different knowledge reading module may be employed, and the knowledge reading module dynamically decides the read knowledge in the knowledge base according to the context information for the current appreciation or inference. An attention mechanism or other specially designed neural networks may be adopted for the knowledge reading module. It should be noted that the knowledge bases dynamically read by each understanding module layer correspondingly are learned in advance when the intelligent question-answering system is trained.

S203: based on the question and the data information after the multilayer appreciation, deciding the answer to the question by means of answer range calibration, program instruction generation or answer selection.

This step may be performed by the decision module in the decision layer.

The decision module may decide the answer to the question in different ways based on different data information. For example, for the knowledge graph question-answering type, a final operation of deciding the answer to the question may be generation of a program instruction of a Gremlin statement; for the table question-answering type, the final operation of deciding the answer to the question may be generation of a program instruction of a structured query language (SQL) statement. For reading comprehension, output is an answer range; and for the table question-answering type and the graph question-answering type, the output is the program instruction. No matter which way is adopted to label the answer, accuracy of the answer may be effectively guaranteed.

S204: outputting the answer to the question.

Referring to the three forms of step S203, the output of this step may be start and end positions of the answer, a generated program instruction, and an answer option. The generated program instruction may be a SQL/Gremlin statement, or the like. When the output answer is the start and end positions of the answer or the generated program instruction, the final answer may be obtained from the data information based on the start and end positions of the answer or the generated program instruction.

It should be noted that the intelligent question-answering system in the present embodiment is required to be pre-trained before use. Before training, a plurality of pieces of training data may be collected in advance, and each piece of training data may include a training question, corresponding training data information, and a labeled real answer. For a form of the labeled real answer, reference may be made to the form of the output answer of step S203. Meanwhile, a plurality of knowledge bases which may be read by the intelligent question-answering system are also provided.

During training, the training question and the training data information in each piece of training data are input into the intelligent question-answering system, the intelligent question-answering system may perform layer-wise deepening appreciation by means of the plurality of knowledge bases based on the input information using a plurality of understanding module layers, and then, a predicted answer to the training question is decided based on the training question and the data information after inference by the plural understanding module layers. Then, a loss function is built based on the predicted answer and the labeled real answer. Whether the loss function converges is judged, and if no, parameters of the whole intelligent question-answering system are adjusted, such as parameters for reading the plurality of knowledge bases, parameters of each understanding module layer, parameters for the decision module to decide an answer, or the like. In the present embodiment, a method for adjusting the parameters of the intelligent question-answering system is based on the direction of convergence of the loss function. The intelligent question-answering system is continuously trained in this way using the plural pieces of training data until the loss function always converges in successive rounds of training, and at this point, all the parameters of the intelligent question-answering system are determined, and then, the intelligent question-answering system is determined.

In the method for processing intelligent question-answering according to the present embodiment, the related knowledge information is introduced layer by layer using the multilayer understanding model, and compared with one-time knowledge introduction, a hierarchical structure of deep appreciation and inference may be effectively matched, and different understanding module layers dynamically introduce different knowledge information according to the question and the data information after the appreciation by the previous layer, thus more effectively using the external knowledge information, and finally achieving better understanding and inference effects. Therefore, the technical solution of the present embodiment may more truly simulate the human understanding and inference process, effectively improve accuracy of the answer and an intelligent question-answering efficiency, and enhance question answering intelligence.

Figure 4:
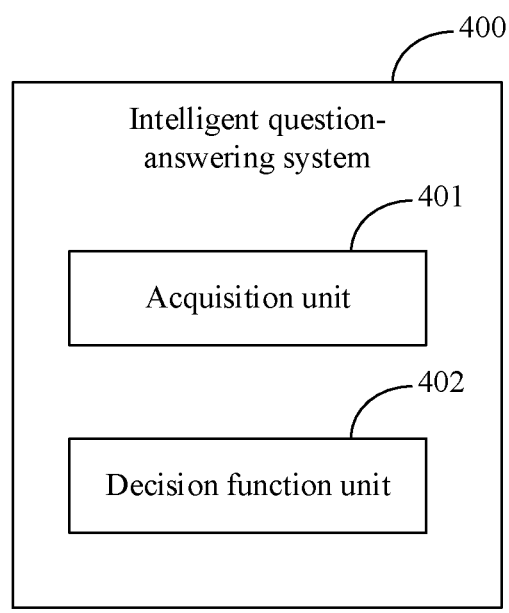
FIG. 4 is a schematic diagram according to a third embodiment of the present disclosure.

FIG. 4 is a schematic diagram according to a third embodiment of the present disclosure; as shown in FIG. 4, the present embodiment provides an intelligent question-answering apparatus 400, including an acquisition unit 401 configured to acquire an input question and input data information; and a decision function unit 402 configured to, based on the question, the data information and a plurality of knowledge bases, decide an answer to the question by multilayer appreciation using a pre-trained multilayer understanding model.

The intelligent question-answering apparatus 400 according to the present embodiment has the same implementation as the above-mentioned relevant method embodiment by adopting the above-mentioned units to implement the implementation principle and the technical effects of the intelligent question-answering processing operation, and for details, reference may be made to the description of the above-mentioned relevant embodiment, and details are not repeated herein.

Figure 5:
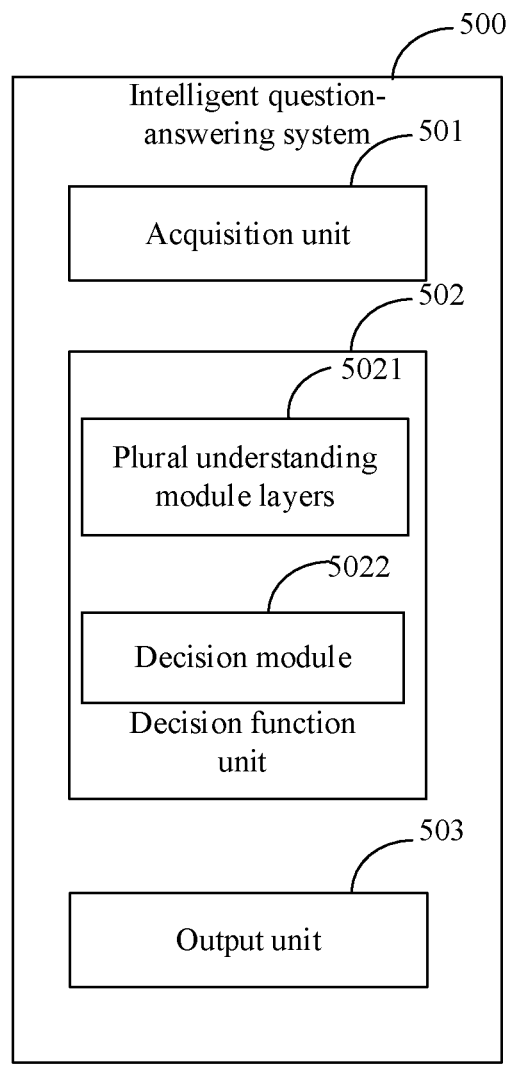
FIG. 5 is a schematic diagram according to a fourth embodiment of the present disclosure.

FIG. 5 is a schematic diagram according to a fourth embodiment of the present disclosure; as shown in FIG. 5, the technical solution of an intelligent question-answering apparatus 500 according to the present embodiment of the present application is further described in more detail based on the technical solution of the above-mentioned embodiment shown in FIG. 4.

As shown in FIG. 5, in the intelligent question-answering apparatus 500 according to the present embodiment, a decision function unit 502 includes plural understanding module layers 5021 configured to perform layer-wise deepening appreciation by means of a plurality of knowledge bases based on a question and data information, so as to obtain a question and data information after multilayer appreciation; and a decision module 5022 configured to decide an answer to the question based on the question and the data information after the multilayer appreciation.

Optionally, during specific implementation of the plural understanding module layers 5021, a first understanding module layer in a multilayer understanding model may be configured to introduce first-layer knowledge information from the plural knowledge bases based on the question and the data information, and then understand the question and the data information based on the introduced first-layer knowledge information to obtain a first question and first data information after the appreciation.

Second to last understanding module layers of the multilayer understanding model have same processing logic.

For example, the second understanding module layer may be configured to introduce second-layer knowledge information from the plural knowledge bases based on the first question and the first data information after the appreciation by the previous understanding module layer (i.e., the first understanding module layer), and then, based on the introduced second-layer knowledge information, understand the first question and the first data information after the appreciation by the previous layer, so as to obtain a second question and second data information after the appreciation.

The third understanding module layer may be configured to introduce third-layer knowledge information from the plural knowledge bases based on the second question and the second data information after the appreciation by the previous understanding module layer (i.e., the second understanding module layer), and then, based on the introduced third-layer knowledge information, understand the second question and the second data information after the appreciation by the previous layer, so as to obtain a third question and third data information after the appreciation.

By analogy, it may be known that the jth understanding module layer (j is greater than 1 and less than M) may be configured to introduce jth-layer knowledge information from the plural knowledge bases based on the (j−1)th question and the (j−1)th data information after the appreciation by the previous understanding module layer (i.e., the (j−1)th understanding module layer), and then, based on the introduced jth-layer knowledge information, understand the (j−1)th question and the (j−1)th data information after the appreciation by the previous layer, so as to obtain a jth question and jth data information after the appreciation.

The last understanding module layer (i.e., the Mth understanding module layer) may be configured to introduce Mth-layer knowledge information from the plural knowledge bases based on the (M−1)th question and the (M−1)th data information after the appreciation by the previous understanding module layer (i.e., the (M−1)th understanding module layer), and then, based on the introduced Mth-layer knowledge information, understand the (M−1)th question and the (M−1)th data information after the appreciation by the previous layer, so as to obtain an Mth question and Mth data information after the appreciation (i.e., the question and the data information after the appreciation by the M layers).

Further optionally, i understanding module layers from the first understanding module layer to an ith understanding module layer in the plural understanding module layers 5021 are configured to based on the question and the data information, perform layer-wise appreciation at a morphology and/or syntax level by means of the plural knowledge bases, so as to obtain an ith question and ith data information, i being a positive integer greater than 1 and less than M.

Further optionally, M-i understanding module layers from a (i+1)th understanding module layer to the Mth understanding module layer in the plural understanding module layers 5021 are configured to based on the ith question and the ith data information after the appreciation by the ith layer, perform layer-wise deepening appreciation at a semantics and/or pragmatics level by means of the plural knowledge bases, so as to obtain the question and the data information after the multilayer appreciation.

Further optionally, the decision module 5022 is configured to based on the question and the data information after the multilayer appreciation, decide the answer to the question by means of answer range calibration, program instruction generation or answer selection.

Further optionally, the intelligent question-answering system 500 according to the present embodiment may further include an output unit 503 configured to output the answer to the question decided by the decision module 5022.

An acquisition unit 501 in the intelligent question-answering system 500 according to the present embodiment has the same function as the acquisition unit 401 in the embodiment shown in FIG. 4, and details are not repeated herein.

The intelligent question-answering apparatus 500 according to the present embodiment has the same implementation as the above-mentioned relevant method embodiment by adopting the above-mentioned units to implement the implementation principle and the technical effects of the intelligent question-answering processing operation, and for details, reference may be made to the description of the above-mentioned relevant embodiment, and details are not repeated herein.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 6:
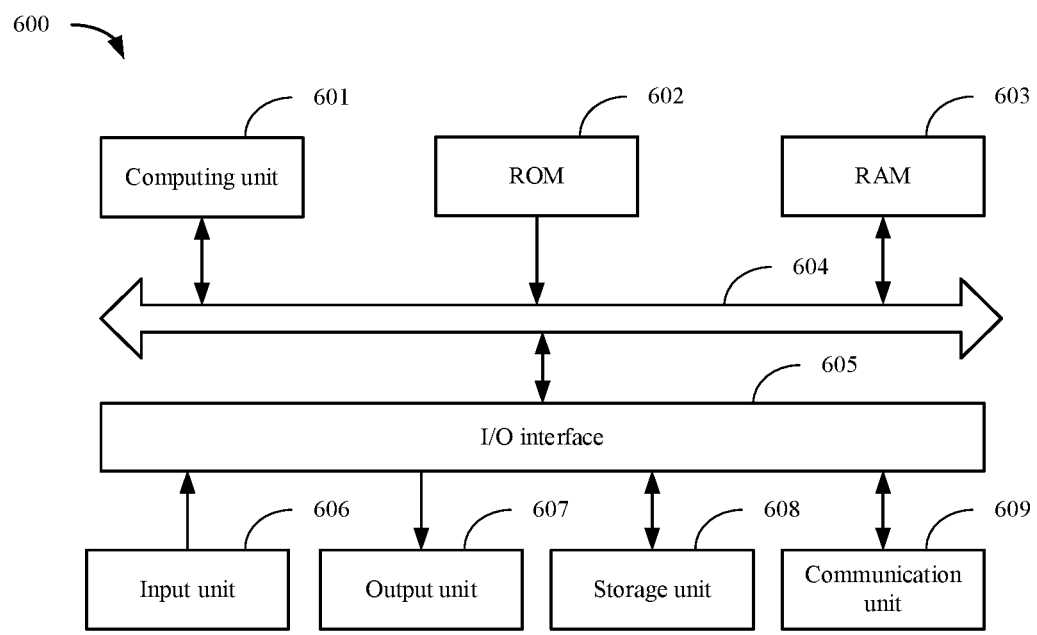
FIG. 6 is a block diagram of an electronic device configured to implement a method for processing intelligent question-answering according to the embodiment of the present disclosure.

FIG. 6 shows a schematic block diagram of an exemplary electronic device 600 which may be configured to implement the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method for processing intelligent question-answering. For example, in some embodiments, the method for processing intelligent question-answering may be implemented as a computer software program tangibly contained in a machine readable medium, such as the storage unit 608. In some embodiments, part or all of the computer program may be loaded and/or installed into the device 600 via the ROM 602 and/or the communication unit 609. When the computer program is loaded into the RAM 603 and executed by the computing unit 601, one or more steps of the method for processing intelligent question-answering described above may be performed. Alternatively, in other embodiments, the computing unit 601 may be configured to perform the method for processing intelligent question-answering by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A computer-implemented method for processing intelligent question-answering, comprising, at the level of an intelligent question-answering system:

acquiring an input question in a natural language form and input data information in a form of a graph, a table, a document, or a video and represented based on characters; and based on the question, the data information and a plurality of knowledge bases, deciding an answer to the question by multilayer appreciation using a pre-trained multilayer understanding model, wherein the based on the question, the data information and a plurality of knowledge bases, deciding an answer to the question by multilayer appreciation using a pre-trained multilayer understanding model comprises:

based on the question and the data information, performing layer-by-layer appreciation by means of the plurality of knowledge bases using each understanding module layer in the multilayer understanding model, so as to obtain a question and data information after multilayer appreciation;

deciding the answer to the question based on the question and the data information after the multilayer appreciation, and wherein the multilayer understanding model comprises M understanding module layers, M being a positive integer; the based on the question and the data information, performing layer-by-layer appreciation by means of the plurality of knowledge bases using each understanding module layer in the multilayer understanding model, so as to obtain a question and data information after multilayer appreciation comprises:

based on the question and the data information, adopting i understanding module layers from a first understanding module layer to an ith understanding module layer in the multilayer understanding model to perform layer-wise appreciation at a morphology and/or syntax level by means of the plural knowledge bases, so as to obtain an ith question and ith data information, i being a positive integer greater than 1 and less than M.

2. The method according to claim 1, wherein the based on the question and the data information, performing layer-by-layer appreciation by means of the plurality of knowledge bases using each understanding module layer in the multilayer understanding model, so as to obtain a question and data information after multilayer appreciation further comprises:

based on the ith question and the ith data information after the appreciation by the ith understanding module layer, successively adopting M-i understanding module layers from a (i+1)th understanding module layer to the Mth understanding module layer in the multilayer understanding model to perform layer-wise appreciation at a semantics and/or pragmatics level by means of the plural knowledge bases, so as to obtain the question and the data information after the multilayer appreciation.

3. The method according to claim 1, wherein the based on the question and the data information, performing layer-by-layer appreciation by means of the plurality of knowledge bases using each understanding module layer in the multilayer understanding model, so as to obtain a question and data information after multilayer appreciation comprises:

based on the question and the data information, adopting the first understanding module layer in the multilayer understanding model to introduce first-layer knowledge information from the plural knowledge bases; and understanding the question and the data information based on the introduced first-layer knowledge information to obtain a first question and first data information after the appreciation by the first understanding module layer.

4. The method according to claim 1, wherein the based on the question and the data information, performing layer-by-layer appreciation by means of the plurality of knowledge bases using each understanding module layer in the multilayer understanding model, so as to obtain a question and data information after multilayer appreciation comprises:

based on a (j−1)th question and (j−1)th data information after appreciation by a (j−1)th understanding module layer, adopting a jth understanding module layer in the multilayer understanding model to introduce jth-layer knowledge information from the plural knowledge bases, j being a positive integer greater than 1 and less than or equal to M;

understanding the (j−1)th question and the (j−1)th data information based on the introduced jth-layer knowledge information to obtain a jth question and jth data information.

5. The method according to claim 1, wherein the based on the question and the data information, performing layer-by-layer appreciation by means of the plurality of knowledge bases using each understanding module layer in the multilayer understanding model, so as to obtain a question and data information after multilayer appreciation comprises:

based on the question and the data information, adopting the first understanding module layer in the multilayer understanding model to introduce first-layer knowledge information from the plural knowledge bases; and understanding the question and the data information based on the introduced first-layer knowledge information to obtain a first question and first data information after the appreciation by the first understanding module layer.

6. The method according to claim 1, wherein the based on the question and the data information, performing layer-by-layer appreciation by means of the plurality of knowledge bases using each understanding module layer in the multilayer understanding model, so as to obtain a question and data information after multilayer appreciation comprises:

based on a (j−1)th question and (j−1)th data information after appreciation by a (j−1)th understanding module layer, adopting a jth understanding module layer in the multilayer understanding model to introduce jth-layer knowledge information from the plural knowledge bases, j being a positive integer greater than 1 and less than or equal to M;

understanding the (j−1)th question and the (j−1)th data information based on the introduced jth-layer knowledge information to obtain a jth question and jth data information.

7. The method according to claim 1, wherein the deciding the answer to the question based on the question and the data information after the multilayer appreciation comprises:

based on the question and the data information after the multilayer appreciation, deciding the answer to the question by means of answer range calibration, program instruction generation or answer selection.

8. The method according to claim 1, wherein the deciding the answer to the question based on the question and the data information after the multilayer appreciation comprises:

based on the question and the data information after the multilayer appreciation, deciding the answer to the question by means of answer range calibration, program instruction generation or answer selection.

9. An electronic device, comprising:

at least one processor; and a memory communicatively connected with the at least one processor;

wherein the memory stores instructions executable by the at least one processor, and the instructions are executed by the at least one processor to enable the at least one processor to perform a method for processing intelligent question-answering, wherein the method comprises, at the level of an intelligent question-answering system:

acquiring an input question in a natural language form and input data information in a form of a graph, a table, a document, or a video and represented based on characters; and based on the question, the data information and a plurality of knowledge bases, deciding an answer to the question by multilayer appreciation using a pre-trained multilayer understanding model, wherein the based on the question, the data information and a plurality of knowledge bases, deciding an answer to the question by multilayer appreciation using a pre-trained multilayer understanding model comprises:

based on the question and the data information, performing layer-by-layer appreciation by means of the plurality of knowledge bases using each understanding module layer in the multilayer understanding model, so as to obtain a question and data information after multilayer appreciation;

deciding the answer to the question based on the question and the data information after the multilayer appreciation, and wherein the multilayer understanding model comprises M understanding module layers, M being a positive integer; the based on the question and the data information, performing layer-by-layer appreciation by means of the plurality of knowledge bases using each understanding module layer in the multilayer understanding model, so as to obtain a question and data information after multilayer appreciation comprises:

based on the question and the data information, adopting i understanding module layers from a first understanding module layer to an ith understanding module layer in the multilayer understanding model to perform layer-wise appreciation at a morphology and/or syntax level by means of the plural knowledge bases, so as to obtain an ith question and ith data information, i being a positive integer greater than 1 and less than M.

10. The electronic device according to claim 9, wherein the based on the question and the data information, performing layer-by-layer appreciation by means of the plurality of knowledge bases using each understanding module layer in the multilayer understanding model, so as to obtain a question and data information after multilayer appreciation further comprises:

based on the ith question and the ith data information after the appreciation by the ith understanding module layer, successively adopting M-i understanding module layers from a (i+1)th understanding module layer to the Mth understanding module layer in the multilayer understanding model to perform layer-wise appreciation at a semantics and/or pragmatics level by means of the plural knowledge bases, so as to obtain the question and the data information after the multilayer appreciation.

11. The electronic device according to claim 9, wherein the based on the question and the data information, performing layer-by-layer appreciation by means of the plurality of knowledge bases using each understanding module layer in the multilayer understanding model, so as to obtain a question and data information after multilayer appreciation comprises:
based on the question and the data information, adopting the first understanding module layer in the multilayer understanding model to introduce first-layer knowledge information from the plural knowledge bases; and
understanding the question and the data information based on the introduced first-layer knowledge information to obtain a first question and first data information after the appreciation by the first understanding module layer.

12. The electronic device according to claim 9, wherein the based on the question and the data information, performing layer-by-layer appreciation by means of the plurality of knowledge bases using each understanding module layer in the multilayer understanding model, so as to obtain a question and data information after multilayer appreciation comprises:
based on a (j−1)th question and (j−1)th data information after appreciation by a (j−1)th understanding module layer, adopting a jth understanding module layer in the multilayer understanding model to introduce jth-layer knowledge information from the plural knowledge bases, j being a positive integer greater than 1 and less than M;
understanding the (j−1)th question and the (j−1)th data information based on the introduced jth-layer knowledge information to obtain a jth question and jth data information.

13. The electronic device according to claim 9, wherein the based on the question and the data information, performing layer-by-layer appreciation by means of the plurality of knowledge bases using each understanding module layer in the multilayer understanding model, so as to obtain a question and data information after multilayer appreciation comprises:
based on the question and the data information, adopting the first understanding module layer in the multilayer understanding model to introduce first-layer knowledge information from the plural knowledge bases; and
understanding the question and the data information based on the introduced first-layer knowledge information to obtain a first question and first data information after the appreciation by the first understanding module layer.

14. The electronic device according to claim 9, wherein the based on the question and the data information, performing layer-by-layer appreciation by means of the plurality of knowledge bases using each understanding module layer in the multilayer understanding model, so as to obtain a question and data information after multilayer appreciation comprises:
based on a (j−1)th question and (j−1)th data information after appreciation by a (j−1)th understanding module layer, adopting a jth understanding module layer in the multilayer understanding model to introduce jth-layer knowledge information from the plural knowledge bases, j being a positive integer greater than 1 and less than M;
understanding the (j−1)th question and the (j−1)th data information based on the introduced jth-layer knowledge information to obtain a jth question and jth data information.

15. The electronic device according to claim 9, wherein the deciding the answer to the question based on the question and the data information after the multilayer appreciation comprises:
based on the question and the data information after the multilayer appreciation, deciding the answer to the question by means of answer range calibration, program instruction generation or answer selection.

16. A non-transitory computer readable storage medium with computer instructions stored thereon, wherein the computer instructions are used for causing a method for processing intelligent question-answering, wherein the method comprises, at the level of an intelligent question-answering system:
acquiring an input question in a natural language form and input data information in a form of a graph, a table, a document, or a video and represented based on characters; and
based on the question, the data information and a plurality of knowledge bases, deciding an answer to the question by multilayer appreciation using a pre-trained multilayer understanding model,
wherein the based on the question, the data information and a plurality of knowledge bases, deciding an answer to the question by multilayer appreciation using a pre-trained multilayer understanding model comprises:
based on the question and the data information, performing layer-by-layer appreciation by means of the plurality of knowledge bases using each understanding module layer in the multilayer understanding model, so as to obtain a question and data information after multilayer appreciation;
deciding the answer to the question based on the question and the data information after the multilayer appreciation, and
wherein the multilayer understanding model comprises M understanding module layers, M being a positive integer; the based on the question and the data information, performing layer-by-layer appreciation by means of the plurality of knowledge bases using each understanding module layer in the multilayer understanding model, so as to obtain a question and data information after multilayer appreciation comprises:
based on the question and the data information, adopting i understanding module layers from a first understanding module layer to an ith understanding module layer in the multilayer understanding model to perform layer-wise appreciation at a morphology and/or syntax level by means of the plural knowledge bases, so as to obtain an ith question and ith data information, i being a positive integer greater than 1 and less than M.

* * * * *